UNITED STATES PATENT OFFICE.

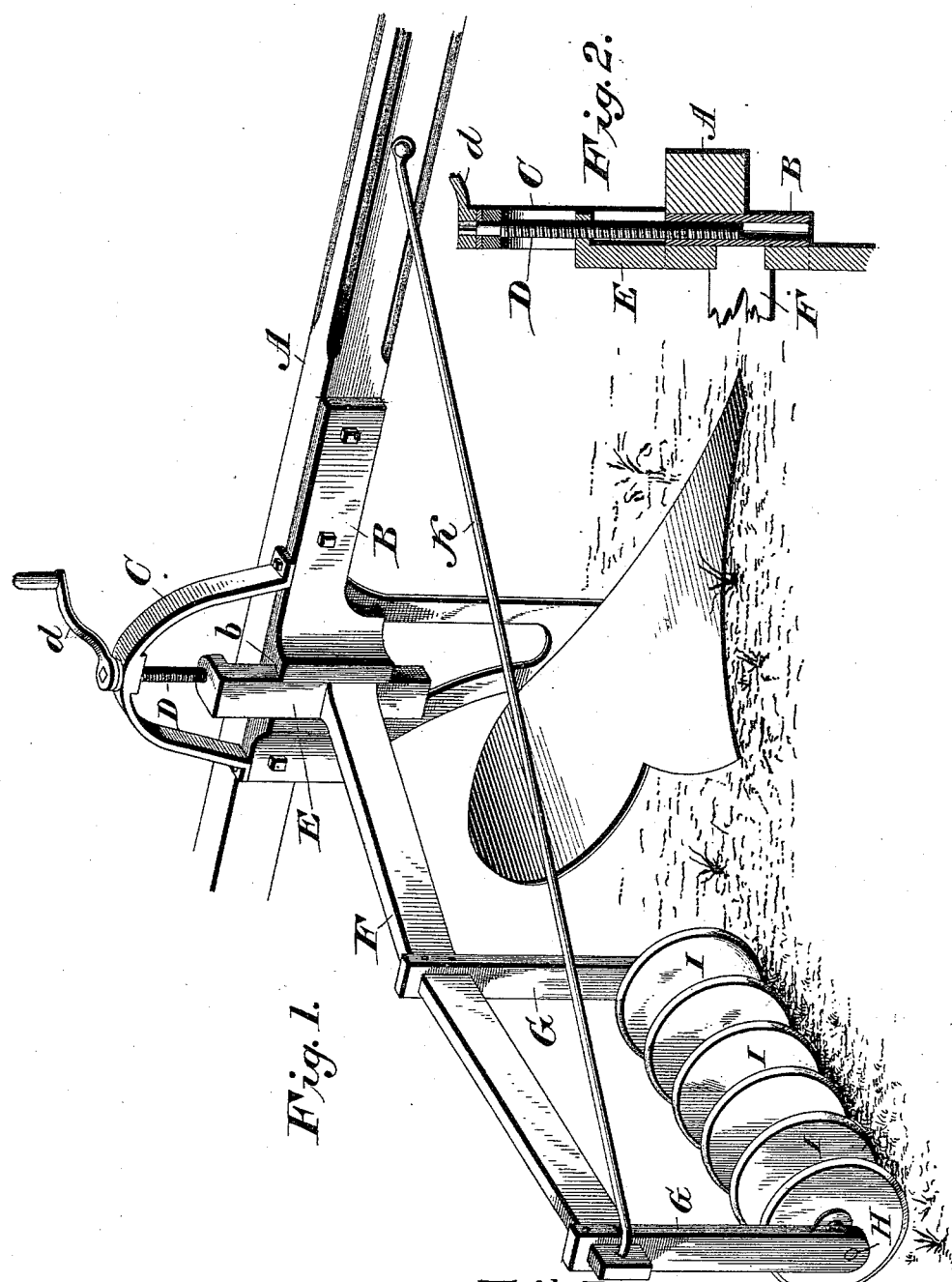

FRITZ REINHOLT WINTER, OF KNOBNOSTER, MISSOURI.

ATTACHMENT FOR PLOWS.

SPECIFICATION forming part of Letters Patent No. 457,689, dated August 11, 1891.

Application filed May 16, 1891. Serial No. 393,047. (No model.)

*To all whom it may concern:*

Be it known that I, FRITZ REINHOLT WINTER, a citizen of the United States of America, residing at Knobnoster, in the county of Johnson and State of Missouri, have invented certain new and useful Improvements in Attachments for Plows; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in attachments for plows.

The object of the invention is to provide a plow with an attachment which will pulverize the earth turned by the share, said attachment being carried by the plow-beam, so as to be raised and lowered with the plow and beam, and is provided with means for adjusting the pulverizers.

In the accompanying drawings, forming part of this specification, Figure 1 is a perspective view showing the application of my improvement, and Fig. 2 is a sectional view through the adjusting means.

A refers to a part of the frame of a riding-plow, which is adjustable vertically upon its supporting-wheels in the usual manner. To this beam the plow-standard and one or more of the supporting-wheels are attached in the usual manner.

B designates a part of the frame of my attachment, which is rigidly bolted to the beam B, said part being preferably made up of a casting having a dovetailed slot $b$ and a frame C, apertured centrally to receive an adjusting-screw D, said screw carrying a crank-arm $d$. This screw passes through an inwardly-projecting portion of a beveled slide E, to which a bar F is rigidly secured or formed integral therewith. This bar is preferably bent, as shown, and is provided with depending standards G G, to the lower ends of which is journaled a shaft H, carrying a number of disks I, said disks being located to be on a line with the furrow thrown by the share of the plow. A brace-rod K extends from the end of the bar F to the beam A, and is preferably pivoted to said beam, so that it can swing thereon as the slide E is raised or lowered.

This attachment is especially adapted to be applied to three-wheel sulky-plows, such as are commonly known to the trade as the "Flying Dutchman," and the frame of such plow is provided with levers for raising and lowering the plow. It will be obvious that the attachment will be raised and lowered with the beam A. By means of the slide and screw-threaded shaft the disks I may be adjusted to cut the desired depth into the furrow turned by the plowshare.

I am aware that prior to my invention it has been proposed to attach harrows and pulverizers to plow-frames, rear of the share, so that they will pulverize the earth turned by said share, and I do not claim such devices; but What I do claim as new, and desire to secure by Letters Patent, is—

1. In combination with the beam A, a casting B, secured rigidly thereto and provided with a vertically-movable slide having a projecting arm F, to which the disks I are secured, substantially as set forth.

2. In combination with the beam A, a casting B, rigidly secured thereto and provided with an arch C, and a screw-threaded shaft having a handle $d$ for turning the same, said threaded bar engaging with an offset formed on the slide E, together with a laterally-extending arm F, carrying standards G G, between which are journaled rotary disks I, substantially as set forth.

3. In combination with a plow and beam, a casting B, having a dovetailed recess, a slide E, adapted to move therein, said slide carrying a laterally-projecting bent arm F, standards G G, carried thereby, a shaft H, having disks I mounted thereon, a brace-rod K, pivoted to the plow-beam and secured to the outer end of the bar F, and means for raising and lowering the slide E, substantially as set forth.

In testimony whereof I affix my signature in presence of two witnesses.

FRITZ REINHOLT WINTER.

Witnesses:
 JAMES HOGAN,
 W. A. TRIPLETT.